United States Patent
Hester, Jr.

[15] 3,674,777
[45] July 4, 1972

[54] PROCESS FOR PREPARING 1,3-DIHYDRO-5-PHENYL-2H-1,4-BENZODIAZEPINE-2-THIONES

[72] Inventor: Jackson B. Hester, Jr., Galesburg, Mich.
[73] Assignee: The Upjohn Company, Kalamazoo, Mich.
[22] Filed: Feb. 9, 1917
[21] Appl. No.: 114,047

[52] U.S. Cl. ................................260/239.3 D, 260/999
[51] Int. Cl. ..........................................C07d 53/06
[58] Field of Search ..............................260/239.3 D

[56] References Cited

UNITED STATES PATENTS 3,422,091  1/1964  Archer et al. ...................260/239.3 D

OTHER PUBLICATIONS

Culvenor "Amine Oxides" appearing in Rev. Pure and Applied Chem. Vol. 3 pages 99– 103 (1953)

Primary Examiner—Henry R. Jiles
Assistant Examiner—Robert T. Bond
Attorney—Hans L. Berneis and John Kekich

[57] ABSTRACT

A process to convert 5-phenylbenzodiazepine 4-oxides of the formula 1:

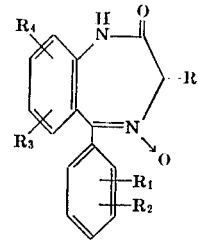

wherein R is selected from hydrogen and alkyl of one to three carbon atoms, inclusive; and wherein $R_1$, $R_2$, $R_3$, and $R_4$ are selected from hydrogen, chloro, bromo, iodo, alkyl of one to three carbon atoms, inclusive, alkoxy of one to three carbon atoms, inclusive, nitro, trifluoromethyl, cyano, alkylthio, alkylsulfinyl, alkylsulfonyl, alkanoylamino and dialkylamino in which the carbon moieties are of one to three carbon atoms, inclusive, with phosphorus pentasulfide to the thione II

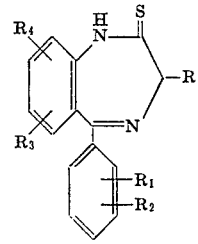

where R, $R_1$, $R_2$, $R_3$, and $R_4$ are defined as above. The thus obtained thions 11 can be used as described in U.S. Pat. No. 3,422,091 issued Jan. 14, 1969, as anticonvulsants, sedatives and muscle relaxants and also as intermediates in the preparation, of other know compounds having these same uses.

5 Claims, No Drawings

PROCESS FOR PREPARING 1,3-DIHYDRO-5-PHENYL-2H-1,4-BENZODIAZEPINE-2-THIONES

BACKGROUND OF THE INVENTION

Field Of The Invention

This invention is concerned with a new process for the production of 1,3-dihydro-5-phenyl-2H-1,4-benzodiazepine-2-thione and derivatives thereof (II) from the 1,3-dihydro-5-phenyl-2H-1,4-benzodiazepin-2-one 4-oxides (I).

The novel process of this invention can be illustratively represented by the formulae:

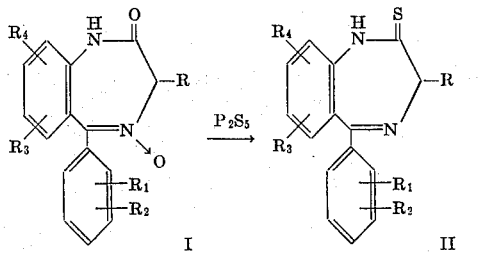

wherein R is selected from hydrogen and alkyl of one to three carbon atoms, inclusive; and wherein $R_1$, $R_2$, $R_3$, and $R_4$ are selected from hydrogen, chloro, bromo, iodo, alkyl of one to three carbon atoms, inclusive, alkoxy of one to three carbon atoms, inclusive, nitro, trifluoromethyl, cyano, alkylthio, alkylsulfinyl, alkylsulfonyl, alkanoylamino, and dialkylamino in which the carbon moieties are of one to three carbon atoms, inclusive.

The process of this invention comprises: treating a compound of structure 1 with phosphorus pentasulfide in an inert organic solvent to give compound II above, thereby simultaneously replacing an amido oxygen atom with sulfur and reducing an ⁼N → O to trivalent nitrogen.

DESCRIPTION OF THE PREFERRED EMBODIMENT

Alkyl groups of one to three carbon atoms, inclusive, are exemplified by methyl, ethyl, propyl, and isopropyl.

The carbon chain moiety of alkoxy, alkylthio, alkylsulfinyl, alkylsulfonyl, dialkylamino which is of one to three carbon atoms, inclusive, is defined as alkyl of one to three carbon atoms, inclusive, above.

The alkanoylamino group of one to three carbon atoms consists of formamido

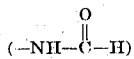

acetamido and propionamido.

The compounds and uses of formula II compounds are known and are well described, e.g., in U.S. Pat. No. 3,422,091.

The process of converting a compound of the formula III

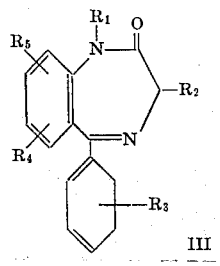

wherein $R_1$ is hydrogen, alkyl or alkenyl, $R_2$ is hydrogen or alkyl; $R_3$, $R_4$, $R_5$, are hydrogen, halogen, —$CF_3$, alkyl, alkylthio, alkylsulfinyl, cyano, amino, nitro, alkanoylamino, dialkylamino, and alkoxy, with phosphorus pentasulfide to the corresponding compound of formula II has been described in the prior cited U.S. Pat. No. 3,422,091. This process requires a lengthy purification following completion of the reaction.

The new process of this reaction gives a cleaner conversion and requires a much shorter purification method to give, in high yields, products of the formula II. It was also surprising to note that the ⁼N → O group in the 4-position was simultaneously reduced with the exchange reaction occuring in the 2-position.

The compounds II and pharmaceutically acceptable acid addition salts are useful as anticonvulsants, sedatives and muscle relaxants as well as intermediates for other sedative and tranquilizing compounds as further described in detail in U.S. Pat. No. 3,422,091.

The intermediates I and their methods of preparation are known and can be found for example in L. H. Sternbach and E. Reeder [J. Org. Chem. 26, 4936 (1961)] and S. C. Bell et al. [J. Org. Chem 27, 562 (1962)].

In carrying out the process of the present invention a selected compound I is treated in solution or suspension with phosphorus pentasulfide ($P_2S_5$) in excess. In the preferred embodiment of this invention the reaction is carried out in a water-free medium with a carefully purified, inert, organic solvent. As solvents, anhydrous pyridine, pyrrolidine, benzene, toluene, xylenes, or mixtures thereof and the like can be used.

Temperatures between 60°–140° C., usually at the reflux temperature of the mixture, are preferred, but lower or higher temperatures are operable. With pyridine at 110°–115° C. a reaction time of 10 minutes to 2 hours is sufficient. Also a dry nitrogen atmosphere is useful, but not critical.

After the reaction is terminated, the product is isolated by conventional procedures, e.g., extraction, crystallization, chromatography, or the like.

The following examples are illustrative of the process of the present invention, but are not to be construed as limiting.

EXAMPLE 1

7-Chloro-1,3-dihydro-5-phenyl-2H-1,4-benzodiazepine-2-thione

A stirred mixture of 7-chloro-1,3-dihydro-5-phenyl-2H-1,4-benzodiazepin-2-one 4-oxide (28.7 g., 0.100 mole), phosphorous pentasulfide (24 g.) and 800 ml. of dry pyridine was refluxed in a nitrogen atmosphere for 15 minutes, cooled and then concentrated in vacuo. The resulting residue was mixed with water and the mixture extracted with methylene chloride. The methylene chloride extracts were dried over anhydrous magnesium sulfate and concentrated to give a residue. This residue was crystallized from ethanol to give in 3 crops 3.91 g. of material of melting point 225°–226° C. with decomposition, 7.62 g. of melting point 220.5°–222° C. (d.) and 4.11 g. of melting point 221°–222.5° C. (d.) (54.5 percent yield). Recrystallization of this product from chloroform-ethanol gave pure 7-chloro-1,3-dihydro-5-phenyl-2H-1,4-benzodiazepine-2-thione of melting point 246.5°–247° C. (d.).

Anal. calc. for $C_{15}H_{11}ClN_2S$:

C, 62.82; H, 3.87; Cl, 12.36; N, 9.77; S, 11.18.
Found: C, 62.83; H, 3.78; Cl, 12.50; N, 9.77; S, 10.86.

EXAMPLE 2

7-Chloro-1,3-dihydro-5-(o-chlorophenyl)-2H-1,4-benzodiazepine-2-thione

In the manner given in Example 1, 7-chloro-1,3-dihydro-5-(o-chloropheny)-2H-1,4-benzodiazepin-2-one 4-oxide was reacted with phosphorus pentasulfide in pyridine to give 7-chloro-1,3-dihydro-5-(o-chlorophenyl)-2H-1,4-benzodiazepine-2-thione.

EXAMPLE 3

7-Chloro-1,3-dihydro-5-(2,6-difluorophenyl)-2H-1,4-benzodiazepine-2-thione

In the manner given in Example 1, 7-chloro-1,3-dihydro-5-(2,6-difluorophenyl)-2H-1,4-benzodiazepin-2-one 4-oxide was reacted with phosphorous pentasulfide in pyridine to give 7- chloro-1,3-dihydro-5-(2,6-difluorophenyl)-2H-1,4-benzodiazepine-2-thione.

EXAMPLE 4

7-Trifluoromethyl-1,3-dihydro-5-phenyl-2H-1,4-benzodiazepine-2-thione

In the manner given in Example 1, 7-trifluoromethyl-1,3-dihydro-5-phenyl-2H-1,4-benzodiazepin-2-one 4-oxide was reacted with phosphorous pentasulfide in pyridine to give 7-trifluoromethyl-1,3-dihydro-5-phenyl-2H-1,4-benzodiazepine-2-thione.

EXAMPLE 5

7-Nitro-1,3-dihydro-5-phenyl-2H-1,4-benzodiazepine-2-thione

In the manner given in Example 1, 7-nitro-1,3-dihydro-5-phenyl-2H-1,4-benzodiazepin-2-one 4-oxide was reacted with phosphorus pentasulfide in pyridine to give 7-nitro-1,3-dihydro-5-phenyl-2H-1,4-benzodiazepine-2-thione.

EXAMPLE 6

7-Chloro-1,3-dihydro-5-(o-fluorophenyl)-2H-1,4-benzodiazepine-2-thione

In the manner given in Example 1, 7-chloro-1,3-dihydro-5-(O-fluorophenyl)-2H-1,4-benzodiazepin-2-one 4-oxide was reacted with phosphorus pentasulfide in pyridine to give 7-chloro-1,3-dihydro-5-(0-fluorophenyl)-2H-1,4-benzodiazepine-2-thione.

EXAMPLE 7

7-Nitro-1,3-dihydro-5-(o-chlorophenyl)-2H-1,4-benzodiazepine-2-thione

In the manner given in Example 1, 7-nitro-1,3-dihydro-5-(o-chlorophenyl)-2H-1,4-benzodiazepin-2-one 4-oxide was reacted with phosphorous pentasulfide in pyridine to give 7-nitro-1,3-dihydro-5-(o-chlorophenyl)-2H-1,4-benzodiazepine-2-thione.

EXAMPLE 8

1,3-dihydro-5-(o-chlorophenyL)-2H-1,4-benzodiazepine-2-thione

In the manner given in Example 1, 1,3-dihydro-5-(o-chlorophenyl)-2H-1,4-benzodiazepin-2-one 4-oxide was reacted with phosphorous pentasulfide in pyridine to give 1,3-dihydro-5-(o-chlorophenyl)-2H-1,4-benzodiazepine-2thione.

Example 9

6-Methyl-1,3-dihydro-5-(o-methoxyphenyl)-2H-1,4-benzodiazepine-2-thione

In the manner given in Example 1, 6-methyl-1,3-dihydro-5-(o-methoxyphenyl)-2H-1,4-benzodiazepin-2-one 4-oxide was reacted with phosphorous pentasulfide in pyridine to give 6-methyl-1,3-dihydro-5-(o-methoxyphenyl)-2H-1,4-benzodiazepine-2-thione.

EXAMPLE 10

7-Fluoro-1,3-dihydro-5-(p-cyanophenyl)-2H-1,4-benzodiazepine-2-thione

In the manner given in Exampler 1, 7-fluoro-1,3-dihydro-5-(p-cyanophenyl)-2H-1,4-benzodiazepin-2-one 4-oxide was reacted with phosphorous pentasulfide in pyridine to give 7-fluoro-1,3-dihydro-5-(p-cyanophenyl)-2H-1,4-benzodiazepine-2-thione.

EXAMPLE 11

7,9-Dipropyl-1,3-dihydro-5-(p-diethylaminophenyl)-2H-1,4-benzodiazepine-2-thione In the manner given in Example 1, 7,9-dipropyl-1,3-dihydro-5-(p-diethylaminophenyl)-2H-1,4-benzodiazepin-2-one 4-oxide was reacted with phosphorus pentasulfide in pyridine to give 7,9-dipropyl-1,3-dihydro-5-(p-diethylaminophenyl)-2H-1,4-benzodiazepine-2-thione.

EXAMPLE 12

6-Thiomethyl-1,3-dihydro-5-(m-ethylsulfinylphenyl)-2H-1,4-benzodiazepine2-thione In the manner given in Example 1, 6-thiomethyl-1,3-dihydro-5-(m-ethylsulfinylphenyl)-2H1,4-benzodiazepin-2-one 4-oxide was reacted with phosphorus pentasulfide in pyridine to give 6-thiomethyl-1,3-dihydro-5-(m-ethylsulfinylphenyl)-2H-1,4-benzodiazepine-2-thione.

In the same manner given in Example 1, other 1,3-dihydro-5-phenyl-2H-1,4-benzodiazepine-2-thiones (II) can be prepared from the corresponding 1,3-dihydro-5-phenyl-2H-1,4-benzodiazepin-2-one 4-oxides (I) with phosphorus pentasulfide. Representative compounds, thus prepared, include:

6-chloro-1,3-dihydro-5-(m-bromophenyl)-2H-1,4-benzodiazepine-2-thione;

9-chloro-1,3-dihydro-5-phenyl-2H-1,4-benzodiazepine-2-thione;

8-chloro-1,3-dihydro-5-phenyl-2H-1,4-benzodiazepine-2-thione;

7-bromo-1,3-dihydro-5-phenyl-2H-1,4-benzodiazepine-2-thione;

3-methyl-1,3-dihydro-5-(p-fluorophenyl)-2H-1,4-benzodiazepine-2-thione;

7-nitro-1,3dihydro-5-(m-chlorophenyl)-2H-1,4-benzodiazepine-2-thione;

8-nitro-1,3-dihydro-5-(o-chlorophenyl)-2H-1,4-benzodiazepine-2-thione;

7-bromo-1,3-dihydro-5-(o-bromophenyl)-2H-1,4-benzodiazepine-2-thione;

7-methylsulfinyl-1,3-dihydro-5-(o-fluorophenyl)-2H-1,4-benzodiazepine-2-thione;

7-methyl-1,3-dihydro-5-(o-chlorophenyl)-2H-1,4-benzodiazepine-2-thione;

9-methylthio-1,3-dihydro-5-phenyl-2H-1,4-benzodiazepine-2-thione;

7-cyano-1,3-dihydro-5-(o-chlorophenyl)-2H-1,4-benzodiazepine-2-thione;

3,6,8-trimethyl-1,3-dihydro-5-(o-chlorophenyl)-2H-1,4-benzodiazepine-2-thione;

9-propylsulfonyl-7-methyl-1,3-dihydro-5-phenyl-2H-1,4-benzodiazepine-2-thione;

7-trifluoromethyl-1,3-dihydro-5-(p-chlorophenyl)-2H-1,4-benzodiazepine-2-thione;

7-dimethylamino-1,3-dihydro-5-phenyl-2H-1,4-benzodiazepine-2-thione;

7-fluoro-1,3-dihydro-5-(o-chlorophenyl)-2H-1,4-benzodiazepine-2-thione;

7,8-dicyano-1,3-dihydro-5-[p-(methylsulfonyl)phenyl]-2H-1,4-benzodiazepine-2-thione;

6,9-dichloro-1,3-dihydro-5-(p-isopropylphenyl)-2H-1,4-benzodiazepine-2-thione;

7-chloro-1,3-dihydro-5-(3,4-dimethylphenyl)-2H-1,4-benzodiazepine-2-thione;

1,3-dihydro-5-(2-methyl-4-methoxyphenyl)-2H-1,4-benzodiazepine-2-thione;

9-bromo-1,3-dihydro-5-phenyl-2H-1,4-benzodiazepine-2-thione;

8-fluoro-1,3-dihydro-5-phenyl-2H-1,4-benzodiazepine-2-thione;

8-trifluoromethyl-1,3-dihydro-5-phenyl-2H-1,4-benzodiazepine-2-thione;

9-trifluoromethyl-1,3-dihydro-5[p-(propionylamino)phenyl]-2H-1,4-benzodiazepine-2-thione;

8-cyano-1,3-dihydro-5-[p-(trifluoromethyl)phenyl]-2H-1,4-benzodiazepine-2-thione;

7-chloro-1,3-dihydro-5-(p-chlorophenyl)-2H-1,4-benzodiazepine-2-thione;

6-ethylthio-1,3-dihydro-5-(o-bromophenyl)-2H-1,4-benzodiazepine-2-thione;

6,8-dichloro-1,3-dihydro-5-(o-fluorophenyl)-2H-1,4-benzodiazepine-2-thione;
8-propoxy-7-bromo-1,3-dihydro-5-[m-(ethylsulfinyl)phenyl]-2H-1,4-benzodiazepine-2-thione;
9-diisopropylamino-7-methyl-1,3-dihydro-5-[m-(propylsulfonyl)phenyl]-2H-1,4-benzodiazepine-2-thione;
8-bromo-1,3-dihydro-5-(o-fluorophenyl)-2H-1,4-benzodiazepine-2-thione;
3-methyl-1,3-dihydro-5-(o-fluorophenyl)-2H-1,4-benzodiazepine-2-thione;
7-fluoro-1,3-dihydro-5-(p-fluorophenyl)-2H-1,4-benzodiazepine-2-thione;
6,8-diethyl-1,3-dihydro-5-(m-ethylphenyl)-2H-1,4-benzodiazepin-2-thione;
6-nitro-1,3-dihydro-5-(o-cyanophenyl)-2H-1,4 benzodiazepine-2-thione;
7,9-bis(dipropylamino)-1,3-dihydro-5-(o-nitrophenyl)-2H-1,4-benzodiazepine-2-thione;
9-acetylamino-1,3-dihydro-5-(p-cyanophenyl)-2H-1,4-benzodiazepine-2-thione;
and the like.

I claim:

1. A process for the production of a 1,3-dihydro-5-phenyl-2H-1,4-benzodiazepine-2-thione of the formula:

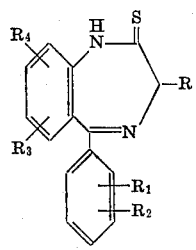

wherein R is selected from hydrogen and alkyl of one to three carbon atoms, inclusive, and wherein $R_1$, $R_2R_3$, and $R_4$ are selected from hydrogen, chloro, bromo, iodo, alkyl of one to three carbon atoms, inclusive, alkoxy of one to three carbon atoms, inclusive, nitro, trifluoromethyl, cyano; alkylthio, alkylsulfinyl, alkylsulfonyl, alkanoylamino, and dialkylamino in which the carbon moieties are of one to three carbon atoms, inclusive, which comprises: heating in an inert organic solvent a 1,3-dihydro-5-phenyl-2H-1,4-benzodiazepin-2-one 4-oxide of the formula I

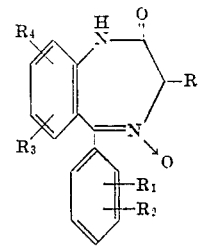

wherein R, $R_1R_2$, $R_3$, and $R_4$ are defined as above, with phosphorus pentasulfide to give the compound of formula II above.

2. The process of claim 1 wherein the solvent is water-free pyridine.

3. The process of claim 1 wherein the reaction is carried out between 60° and 140° C.

4. The process of claim 1 wherein the starting material is 7-chloro-1,3-dihydro-5-phenyl-2H-1,4-benzodiazepin-2-one 4-oxide.

5. The process of claim 4 wherein the solvent is pyridine, the temperature is the reflux temperature of the mixture, and the reaction time is about 15 minutes.

* * * * *